United States Patent
Ruppert, Jr.

Patent Number: 5,791,205
Date of Patent: Aug. 11, 1998

[54] ANTI-ROTATION SPLINE TEETH FOR DIFFERENTIAL CASE

[75] Inventor: Malcolm F. Ruppert, Jr., Hebron, Ohio

[73] Assignee: Meritor Heavy Vehicle Systems, LLC, Troy, Mich.

[21] Appl. No.: 694,714

[22] Filed: Aug. 9, 1996

[51] Int. Cl.⁶ .................................................. F16H 57/02
[52] U.S. Cl. ........................ 74/606 R; 475/230; 475/346
[58] Field of Search ...................... 74/606 R; 475/230, 475/231, 346

[56] References Cited

U.S. PATENT DOCUMENTS

| | | | |
|---|---|---|---|
| 3,521,503 | 7/1970 | Jorg | 74/606 R |
| 4,183,263 | 1/1980 | Osenbaugh | 74/606 R |
| 4,930,367 | 6/1990 | Nagasawa | 74/606 R |
| 5,404,772 | 4/1995 | Jester | 74/606 R |

Primary Examiner—Khoi Q. Ta

[57] ABSTRACT

An improved differential case is provided that resists rotation between the two differential case halves. Spline teeth extend from each of the mating faces of the two differential case halves into grooves in the other. The spline teeth and grooves prevent relative rotation. A method of making the differential case halves is also disclosed.

14 Claims, 3 Drawing Sheets

ANTI-ROTATION SPLINE TEETH FOR DIFFERENTIAL CASE

BACKGROUND OF THE INVENTION

This invention relates to a splined differential case that prevents rotation between the two differential case halves.

Differential cases are utilized in the prior art to receive a first rotational input, and then transmit that input to two axle shafts. In a typical example, a differential case is formed by bolting a plain differential case half to a flange differential case half. The flange differential case half has a flange which receives a gear. The gear is engaged with a pinion gear, and is driven to rotate by the pinion gear. At the interface of the two differential cases, four slots for spiders or shafts are formed. Spider pinion gears are mounted on each of the four spider legs. When the differential case rotates, it rotates the spiders and the spider pinion gears. The spider pinion gears engage side gears which in turn drive axle shafts at opposed ends of a vehicle.

One difficulty with the prior art is that interface between the two differential cases halves sometimes allowed slippage or relative movement. It would be desirable that there be no such slippage. When the two differential case halves slip relative to each other, there is brinelling or uneven wear of the spiders and their mounts within the differential case halves. Slippage can also lead to a failure of the entire carrier. As the two halves slip relative to each other, the bolts which typically secure the two may also loosen.

Another problem is that the load tends to be transmitted more by the flange differential case half than by the plain differential case half. This increases the stresses and strains on the flange differential case half, and it would be desirable to share some of the load with the plain differential case half.

One other problem with the prior art is the spider slots are formed without a reference to the interface of the two differential case halves. Typically, the spider slots have been broached into the already formed end faces of the case halves. The manufacturer has needed to ensure sufficient depth for the spider slot, regardless of manufacturing tolerances at the location of the surface plane of the mating face of each case half. For that reason, the manufacturer has typically cut the spider slot to be deeper than is necessary. This has resulted in a somewhat oval shape for the spider slot. For this reason, it has sometimes been difficult to achieve a true circular slot for the spider. Subsequently, the circular shape of the spider does not have a mating circular shape in the spider slot leading to high contact stresses and local yielding or brinelling of the differential case slot.

SUMMARY OF THE INVENTION

In the disclosed embodiment of this invention, the differential case halves are formed with interfitting spline teeth and notches. In this way, the two halves are better secured against slippage or relative rotation. In preferred embodiments of this invention, the spline teeth are generally wedge-shaped, as are the grooves. This increases the ease of formation for the grooves and teeth, and also provides a better connection to prevent slippage. In preferred embodiments of this invention, the splines are formed on both sides of one pair of the spider slots.

With the present invention, the faces of the differential case halves can be broached at one time to form the splines and grooves, and the interface plane of the case halves. At the same time, one pair of the spider slots can be formed. The spider slots are now formed with reference to the interface plane. One can thus ensure a more accurate formation of the spider slots and achieve a true circular slot. This improves the overall operation of the carrier assembly.

It also would be possible to have one differential case made with one set of splines and the other differential case made with offset splines on opposed sides of the spider slot. This would facilitate assembly, but would require additional tooling and setup. When forming the two groups of splines, a set on each side of the spider slot would be offset relative to the set on the other side. That is, if on one side of the spider slot the plain differential case half had the first spline and the flange differential case half had the first groove, on the opposed side of the spider slot it would be the reverse with the flange differential case half having the first spline. With such an arrangement, both differential case halves can be formed by the same tool. This will reduce the number of tools required for formation of the differential case halves.

In addition, the cutting tool could be formed of a plurality of removable segments. As an example, the spider slot could be formed by a first tool segment, the grooves formed by a second, the mating faces formed by a third, the splines formed by yet another tool, etc. This would allow each of the tools to be independently adjustable. It is preferable that the splines may not "touch bottom" in the grooves. This would facilitate a custom fit of the spline in the grooves, and further provide a force fit with the splines not extending completely into the grooves. By having the removable tool segments, the designer is able to closely control the depth of the grooves relative to the splines.

The improved differential case structure is more resistant to slippage, and thus provides better operation of the entire carrier assembly. These and other features of the present invention will be best understood from the following specification and drawings, of which the following is a brief description.

DETAILED DESCRIPTION OF THE PREFERRED EMBODIMENT

Figure 1:
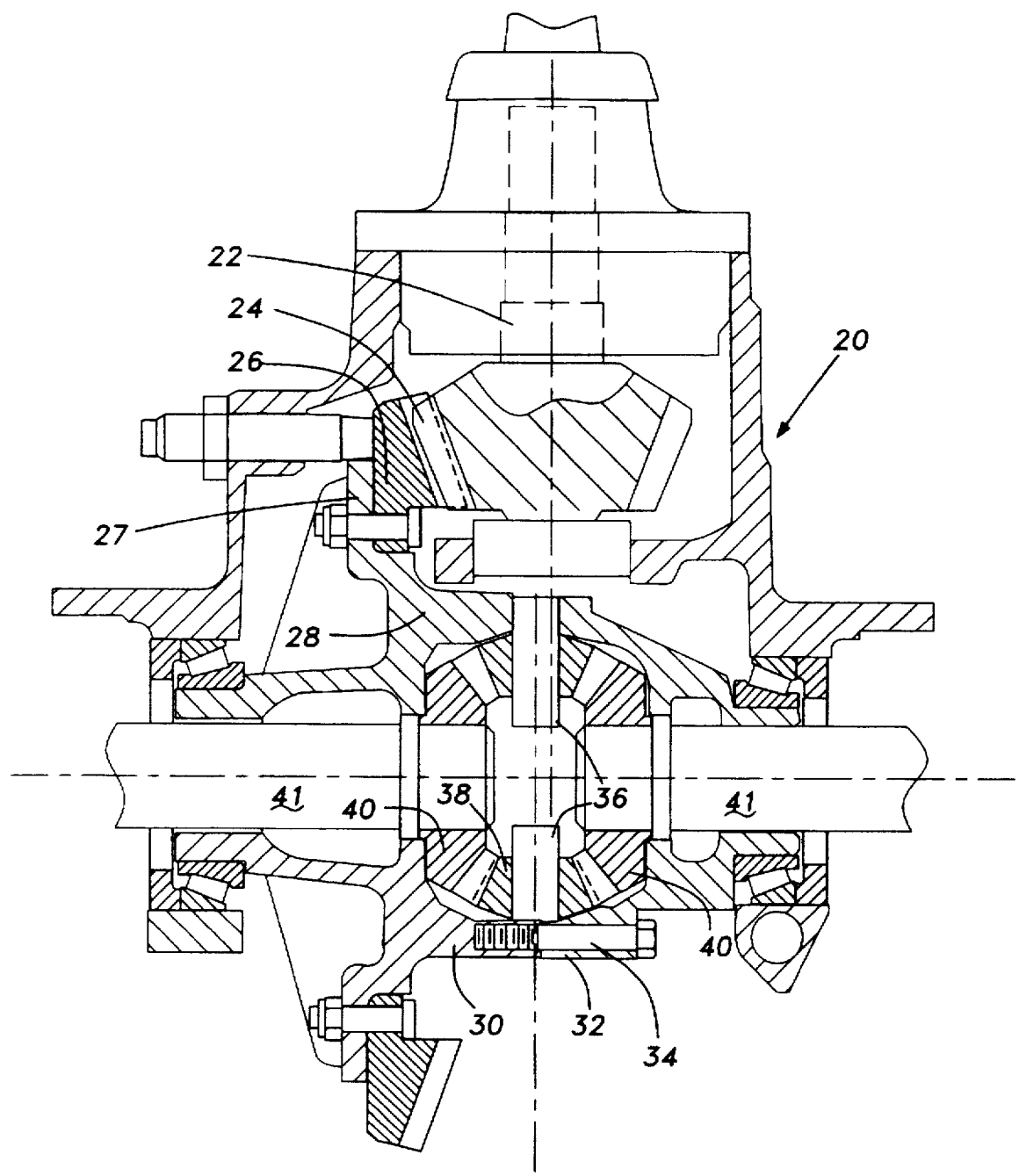
FIG. 1 is a view of a differential case carrier.

FIG. 1 shows a carrier assembly 20 receiving a drive input from a pinion shaft 22 having a pinion gear 24. Pinion gear 24 engages a drive gear 26. Drive gear 26 is bolted to a flange 27 of differential case 28. The differential case 28 is formed by two case halves 30 and 32. A flange differential case half 30 is bolted to a plain differential case half 32 by bolts 34. Spiders 36 are positioned at the interface of the case halves 30 and 32, and mount spider pinion gears 38. Spider pinion gears 38 engage side gears 40, which in turn drive axle shafts 41 which extend outwardly through openings in the case halves 30 and 32. The structure as explained up to this point is as known in the art.

The drive input is directed into the system from the shaft 22, and gear 26 is rotated through gear 24. This in turn rotates the case 28, spiders 36 and spider pinions 38. This will then drive the side gears 40 and the axle shafts 41.

In the prior art, there have been some difficulties with this arrangement since there has sometimes been slippage between the case halves 30 and 32. This slippage has sometimes caused the bolts 34 to loosen, has lead to uneven wear or brinelling adjacent the spiders 36, and has caused other problems with the carrier assembly.

Figure 2A:
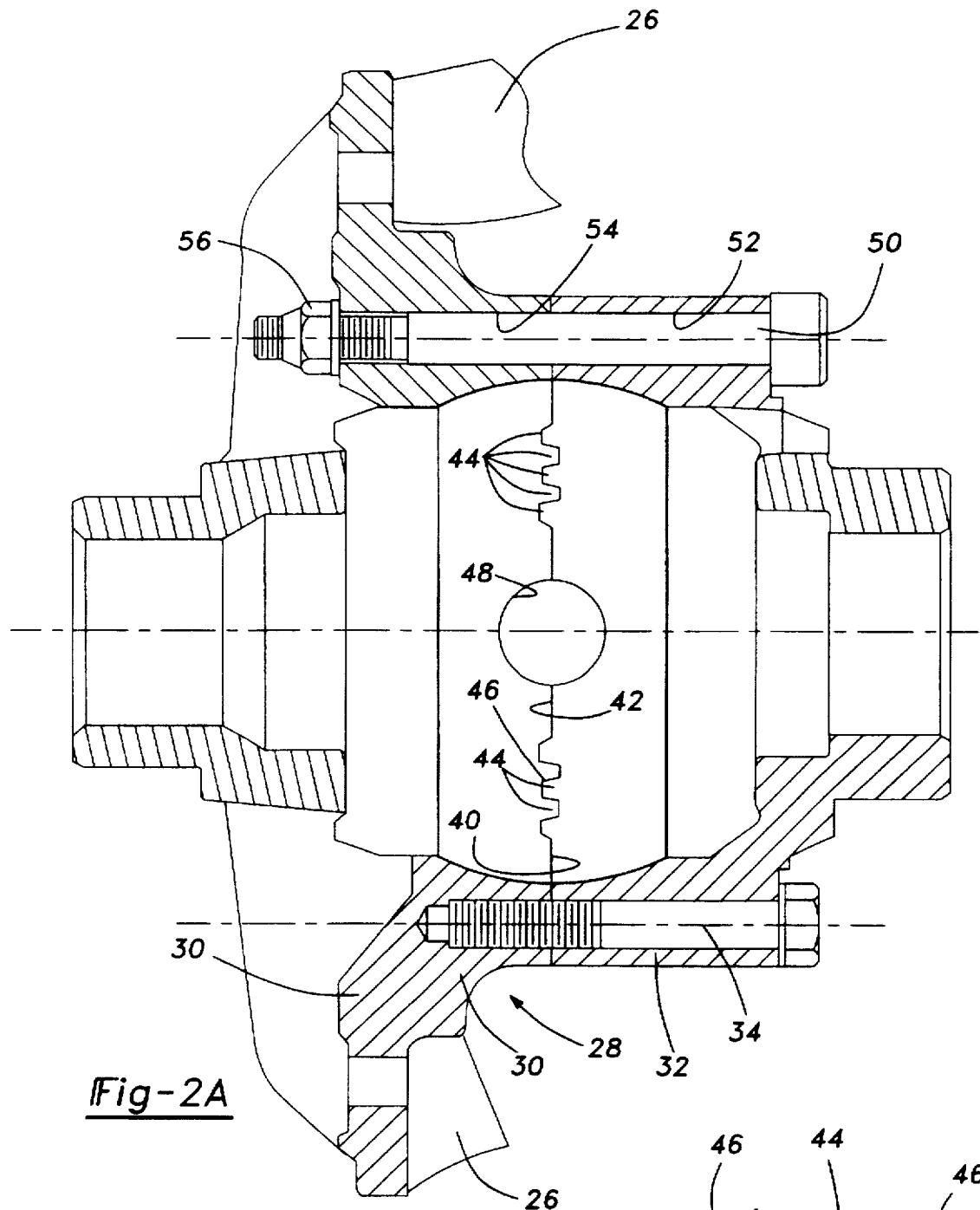
FIG. 2A is a view showing the inventive details of the present invention.

As shown in FIG. 2A, the present invention addresses this problem by providing anti-rotation structure between the case halves 30 and 32. As shown, the mating faces 40 and 42 of the halves 30 and 32, respectively, are formed with a plurality of splined teeth 44 extending into grooves 46 in the opposed case half. The splined teeth 44 extend from each of the case halves 30 and 32 across the nominal plane of the mating faces 40 and 42 into grooves on each of the halves. In a preferred embodiment, there are only several of the splines formed adjacent one set of spider slots 48. As is known, spiders 36 is received in slot 48. It is preferred that at a location on the halves 30 and 32 spaced 180 degrees from that shown in FIG. 2A, further teeth 44 and grooves 46 are formed. Thus, the present invention includes a number of splined teeth and grooves formed adjacent each of one pair of the spider slots.

The splined teeth 44 and grooves 46 provide several benefits. First, there is no slippage between the halves 30 and 32 with this invention. Moreover, the load transmitting rotation from the gear 26 to the spiders 36 is transmitted by case half 30 to case half 32 through the intermitted teeth 44 and grooves 46.

Through bolts 50 preferably extend through openings 52 and 54, and are secured by a nut 56 at an inner end. The bolts are unthreaded throughout the majority of their axially length, and are forced or interference fit into the openings 52 and 54. In this way, the bolts 50 provide a shear pin-like structure helping to prevent relative rotation between the halves 28 and 32. Bolts 50 have been used in the prior art, but have not proven fully satisfactory without the teeth and grooves.

In one further feature, the splined teeth 44 are generally wedge-shaped and received within a generally wedge-shaped groove 46. This simplifies formation of the teeth and grooves. It also simplifies assembly and allows for some slight misalignment of the splines and the grooves. The splines and grooves can be manufactured for a wedge-like fit to provide zero clearance. This would provide a further anti-rotation feature to the overall case.

Figure 2B:
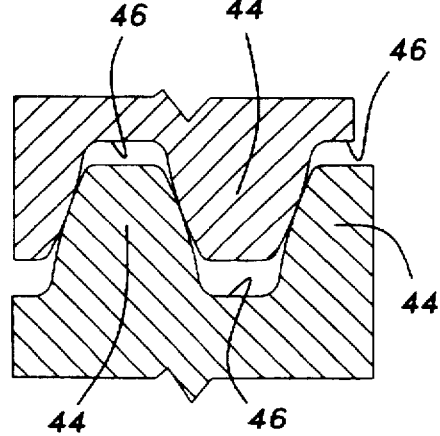
FIG. 2B is a detail of one spline and groove.

As shown in FIG. 2B, the spline teeth 44 may be cut such that they do not "touch bottom" on the grooves 46. In this way, the teeth can be surely wedged within the groove to provide a secure fit preventing rotation. The amount of clearance is greatly exaggerated in FIG. 2B to show its existence.

Figure 3:
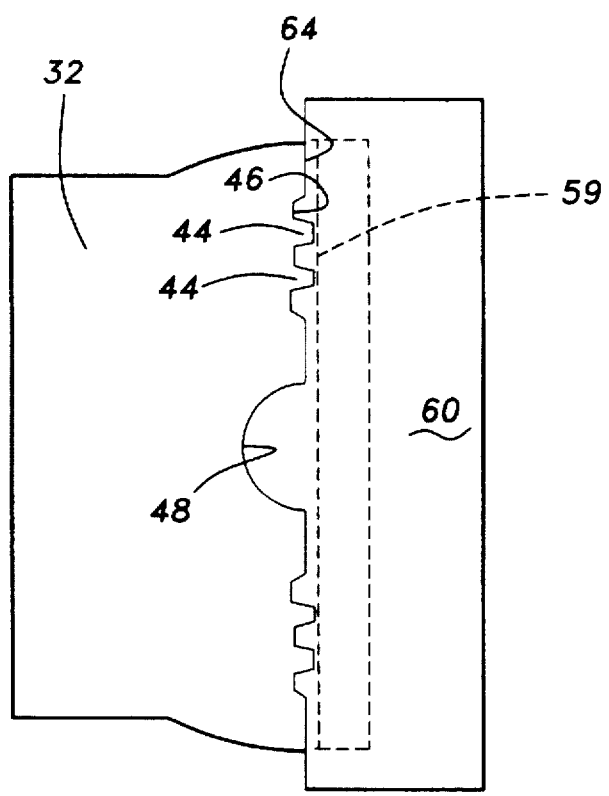
FIG. 3 schematically shows the machining of the inventive differential case halves.

FIG. 3 shows the manufacturing step of formation of the case halves 30 and 32. FIG. 3 shows the case half 32 being formed, however, it should be understood that a similar step would be utilized to form the case half 30.

Preforms are initially cast that have a nominal surface plane 59 defined higher than is necessary for the final end face of the case half 32. A broaching tool 60 is moved across the nominal face 59, and removes material to form a new nominal plane 64 for the mating end face. As shown, the broach cutting tool 60 cuts the grooves 46 more into the half 32 and beyond the nominal plane 64. At the same time, the broaching tool 60 leaves the spline teeth 44 to extend beyond the nominal plane 64. Note that the broaching tool 60 also cuts the spider slot half 48.

The broaching tool 60 has a defined difference between the bottom of the portion which cuts the spider slot half 48 and the nominal plane 64. This distance can be carefully controlled to insure a true circular shape for the spider slots 48. In this way, the manufacturer can insure a true and circular shape for the spider slot half 48. At the same time, the other case half 30 is formed in the same way such that the spider slots which are formed adjacent the teeth and grooves having true circular cross section. In this way, at least two of the spider slots are formed to be truer than has been typically possible in the prior art. This leads to better operation of the entire differential case carrier assembly.

In addition, the cutting tool could be formed of a plurality of removable segments each cutting their own portion of the case half. This would facilitate adjustment of any one of the segments. Further, other types of metal-removing tools may be utilized, such as a milling cutter or a grinding wheel.

The present invention has been disclosed in its preferred form. However, a worker of ordinary skill in the art would recognize that certain modifications would come within the scope of this invention. For that reason, the following claims should be studied to determine the true scope and content of this invention.

I claim:
1. A differential case comprising:
   a flange case half including a flange to be bolted to an input gear, said flange case half having a mating face;
   a plain case half having a mating face abutting said mating face of said flange case half; and
   spline teeth extending from at least one of said case halves into grooves in the other of said case halves to prevent relative rotation between said case halves.

2. A differential case as recited in claim 1, wherein said mating faces are generally parallel, and each of said case halves has spline teeth extending from said mating faces into corresponding grooves formed in the other of said case halves.

3. A differential case as recited in claim 1, wherein there are a plurality of said spline teeth and said grooves.

4. A differential case as recited in claim 3, wherein said flange case half and said plain case half have bolt holes extending through their entire axial length, and a through bolt interference fit into said bolt holes.

5. A differential case as recited in claim 1, wherein spider slot portions are formed in both of said plain case half and said flange case half.

6. A differential carrier as recited in claim 5, wherein said spline teeth are formed on both circumferential sides of said spider slot halves.

7. A differential carrier as recited in claim 6, wherein said spline teeth are formed at the same time as said spider slot halves.

8. A differential carrier assembly comprising:

a spindle gear;

a differential case having a gear member fixed to a flange, said flange being formed on a flange case half, said flange case half defining a mating face;

a plain case half having a mating face abutting said mating face of said flange case half;

both said flange case half and said plain case halves having spider slots at circumferentially spaced locations, said spider slots in said plain case half and in said flange case half being aligned to form generally circular spider slots;

spider members received in said spider slots, and spider gears mounted on said spiders;

side gears mounted within said flange case half and said plain case half, and engaged by said spider gears; and spline teeth extending from at least one of said case halves into grooves in the other of said case halves to prevent relative rotation between said case halves.

9. A carrier assembly as recited in claim 8, wherein said mating faces are generally parallel and each of said case halves have spline teeth extending from said mating faces into corresponding grooves in the other of said case halves.

10. A differential case as recited in claim 8, wherein there are a plurality of spline teeth and said grooves.

11. A carrier assembly as recited in claim 10, wherein said flange case half and said plain case half have bolt holes extending through their entire axial length, and a through-bolt interference fit into said bolt holes.

12. A differential case as recited in claim 8, wherein spider slot portions are formed in both of said plain case half and said flange case half.

13. A differential carrier as recited in claim 12, wherein said spline teeth are formed on both circumferential sides of said spider slot halves.

14. A differential carrier as recited in claim 13, wherein said spline teeth are formed at the same time as said spider slot halves.

\* \* \* \* \*